(12) United States Patent
Huang

(10) Patent No.: US 7,159,319 B2
(45) Date of Patent: Jan. 9, 2007

(54) TUBE CUTTER HAVING RETRACTABLE TOOL DEVICE

(76) Inventor: Wu Sheng Huang, P.O. Box 63-99, Taichung (TW) 406

( * ) Notice: Subject to any disclaimer, the term of this patent is extended or adjusted under 35 U.S.C. 154(b) by 390 days.

(21) Appl. No.: 10/867,548

(22) Filed: Jun. 11, 2004

(65) Prior Publication Data

US 2005/0274023 A1    Dec. 15, 2005

(51) Int. Cl.
  *B23D 21/06* (2006.01)
(52) U.S. Cl. .................. 30/102; 30/99; 7/157; 279/24
(58) Field of Classification Search .............. 30/102, 30/99, 95, 92, 154, 153, 155, 162, 331, 337, 30/334; 15/104.03, 104.05, 104.09; 29/81.01, 29/81.11, 81.021, 81.17, DIG. 98; 279/23.1, 279/24; 7/157, 170
  See application file for complete search history.

(56) References Cited

U.S. PATENT DOCUMENTS

| | | | | |
|---|---|---|---|---|
| 735,845 A * | 8/1903 | Vanderbeek | ............... | 279/23.1 |
| 1,131,863 A * | 3/1915 | Phillips | ............... | 15/176.6 |
| 2,158,728 A * | 5/1939 | Peters | ............... | 279/102 |
| 3,063,147 A * | 11/1962 | Paparelli | ............... | 30/154 |
| 3,307,436 A * | 3/1967 | Jonasson et al. | ............... | 408/187 |
| 3,522,617 A * | 8/1970 | Kowal | ............... | 7/157 |
| 4,177,557 A | 12/1979 | Courty | ............... | 30/102 |
| 4,270,269 A * | 6/1981 | Weil et al. | ............... | 30/102 |
| 4,442,601 A * | 4/1984 | Hirsch et al. | ............... | 30/169 |
| 4,777,725 A * | 10/1988 | Hirsch | ............... | 30/331 |
| 5,206,996 A | 5/1993 | McDaniel | ............... | 30/101 |
| 6,481,105 B1 * | 11/2002 | Haung | ............... | 30/98 |

* cited by examiner

*Primary Examiner*—Kenneth E. Peterson
*Assistant Examiner*—Sean Michalski
(74) *Attorney, Agent, or Firm*—Charles E. Baxley

(57) ABSTRACT

A tube cutter includes a handle having a chamber to slideably receive a casing of a tool device, the casing includes an aperture and two side openings communicating with a U-shaped groove, a tool member includes a shank rotatably received in the aperture of the casing and having a stem for trimming purposes. A U-shaped spring member is received in the groove of the casing, and includes two inwardly bent segments to rotatably retain the shank of the tool member within the aperture of the casing, and two outwardly bent segments extended out through the side openings of the casing, and engageable with the handle, to position the casing to the handle.

10 Claims, 5 Drawing Sheets

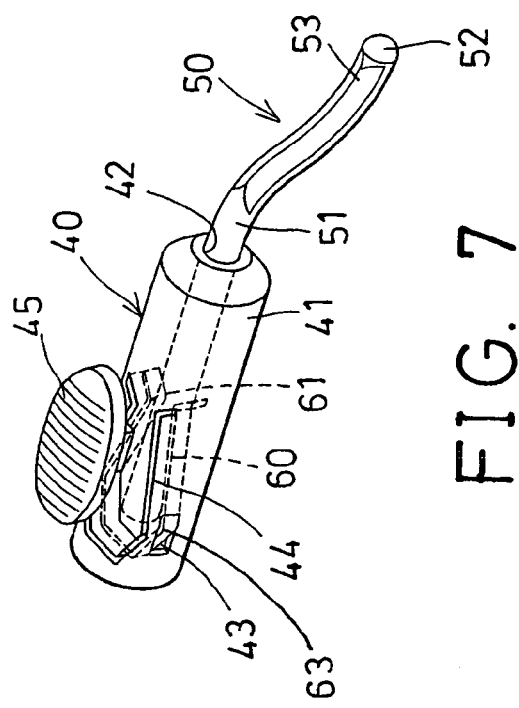
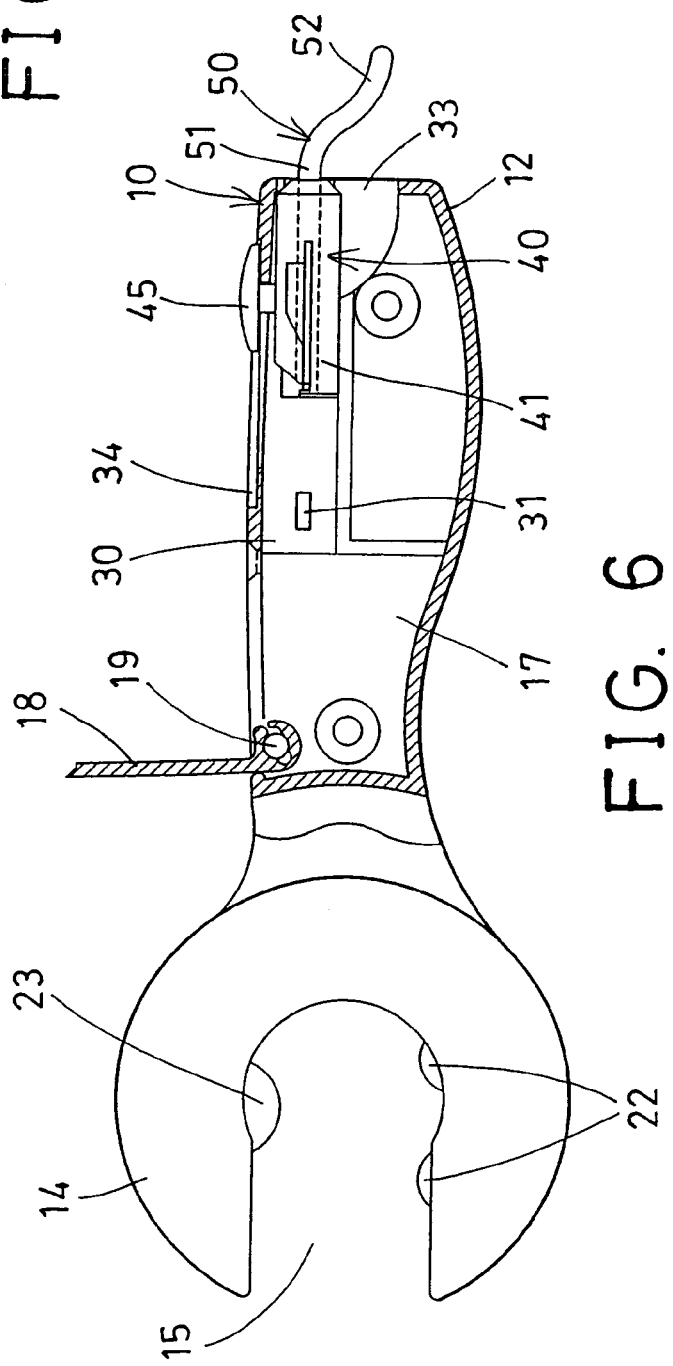
FIG. 7
FIG. 6

US 7,159,319 B2

TUBE CUTTER HAVING RETRACTABLE TOOL DEVICE

BACKGROUND OF THE INVENTION

1. Field of the Invention

The present invention relates to a tube cutter, and more particularly to a tube cutter having one or more spare cutter blades, and having a retractable tool device for trimming or finishing holes or openings of objects.

2. Description of the Prior Art

Various kinds of typical tube cutters have been developed and comprise a cylindrical or circular cutter blade rotatably received in a housing, for engaging with and for cutting tubular members.

For example, U.S. Pat. No. 4,177,557 Courty, and U.S. Pat. No. 5,206,996 McDaniel disclose two of the typical tube cutters, and each also comprises a circular cutter blade rotatably received in a handle or a housing, for engaging with and for cutting tubular members.

For example, U.S. Pat. No. 4,177,557 Courty discloses one of the typical tube cutters comprising jaw member slideably received in a head, to hold or retain the tubular members between the jaw member and the circular cutter blade, and thus to allow the tubular members to be cut by the circular cutter blade.

U.S. Pat. No. 5,206,996 McDaniel discloses another typical tube cutter comprising two roller members rotatably received in a head of one handle member, and a circular cutter blade rotatably received in another handle, for engaging with or for holding or retaining the tubular members between the roller members and the circular cutter blade, and thus to allow the tubular members to be cut by the circular cutter blade.

However, the typical tube cutters have no compartments or spaces to receive spare cutter blades, such that no spare cutter blades may be changed when the original cutter blades have been worn out or damaged.

In addition, the typical tube cutters have no tool devices for trimming or finishing holes or openings of objects.

The present invention has arisen to mitigate and/or obviate the afore-described disadvantages of the conventional tube cutters.

SUMMARY OF THE INVENTION

The primary objective of the present invention is to provide a tube cutter including a space formed or provided therein to receive or store one or more spare cutter blades therein, and for allowing the cutter blades to be changed with the other ones or the new ones when the original cutter blades have been worn out or damaged.

The other objective of the present invention is to provide a tube cutter including a retractable tool device received therein and extendible out for trimming or finishing holes or openings of objects.

In accordance with one aspect of the invention, there is provided a tube cutter comprising a handle including a housing provided thereon, and including a chamber formed therein, and including a rear orifice formed therein and communicating with the chamber thereof, the handle including at least one first cavity formed therein, a tool device including a casing slideably received in the chamber of the housing, and having an aperture and two side openings formed therein, and having a U-shaped groove formed therein and communicating with the aperture and the side openings thereof, a tool member including a shank rotatably received in the aperture of the casing, and including a stem extended from the shank and having at least one trimming edge provided thereon, and a U-shaped spring member received in the U-shaped groove of the casing, and including two inwardly bent segments for engaging with the shank of the tool member, and to rotatably retain the shank of the tool member within the aperture of the casing, and including two outwardly bent segments extended out through the side openings of the casing, and engageable with the first cavity of the handle, to position the casing to the handle when the tool member is moved out of the handle.

The tool device includes a knob attached to the casing, to move the casing relative to the handle, and to move the tool member into and out of the handle. The handle includes a recessed channel formed therein to slideably receive the knob.

The housing includes an opening formed therein, and a wheel rotatably attached to the housing and having an opening formed therein, for aligning with the opening of the housing, and for receiving tubular members to be cut. The wheel includes a cutter blade rotatably attached thereto for cutting tubular members. The wheel includes two rollers rotatably attached thereto for retaining tubular members between the rollers and the cutter blade.

The handle includes at least one second cavity formed therein, and the outwardly bent segments of the spring member are engageable with the second cavity of the handle, to position the casing to the handle when the tool member is moved into the handle.

The handle includes a space formed therein, and at least one spare cutter blade received in the space of the handle. The handle includes a cover rotatably attached thereto, to open or to enclose the space of the handle, and to retain the spare cutter blade in the space of the handle. The stem of the tool member is preferably a bent stem.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 6 is a partial cross sectional view similar to FIG. 3, illustrating the operation of the tube cutter;

FIG. 7 is a perspective view of a tool device which may be slideably or retractably received in the tube cutter, and extendible out of the tube cutter for trimming or finishing holes or openings of objects;

DETAILED DESCRIPTION OF THE PREFERRED EMBODIMENT

Figure 1:
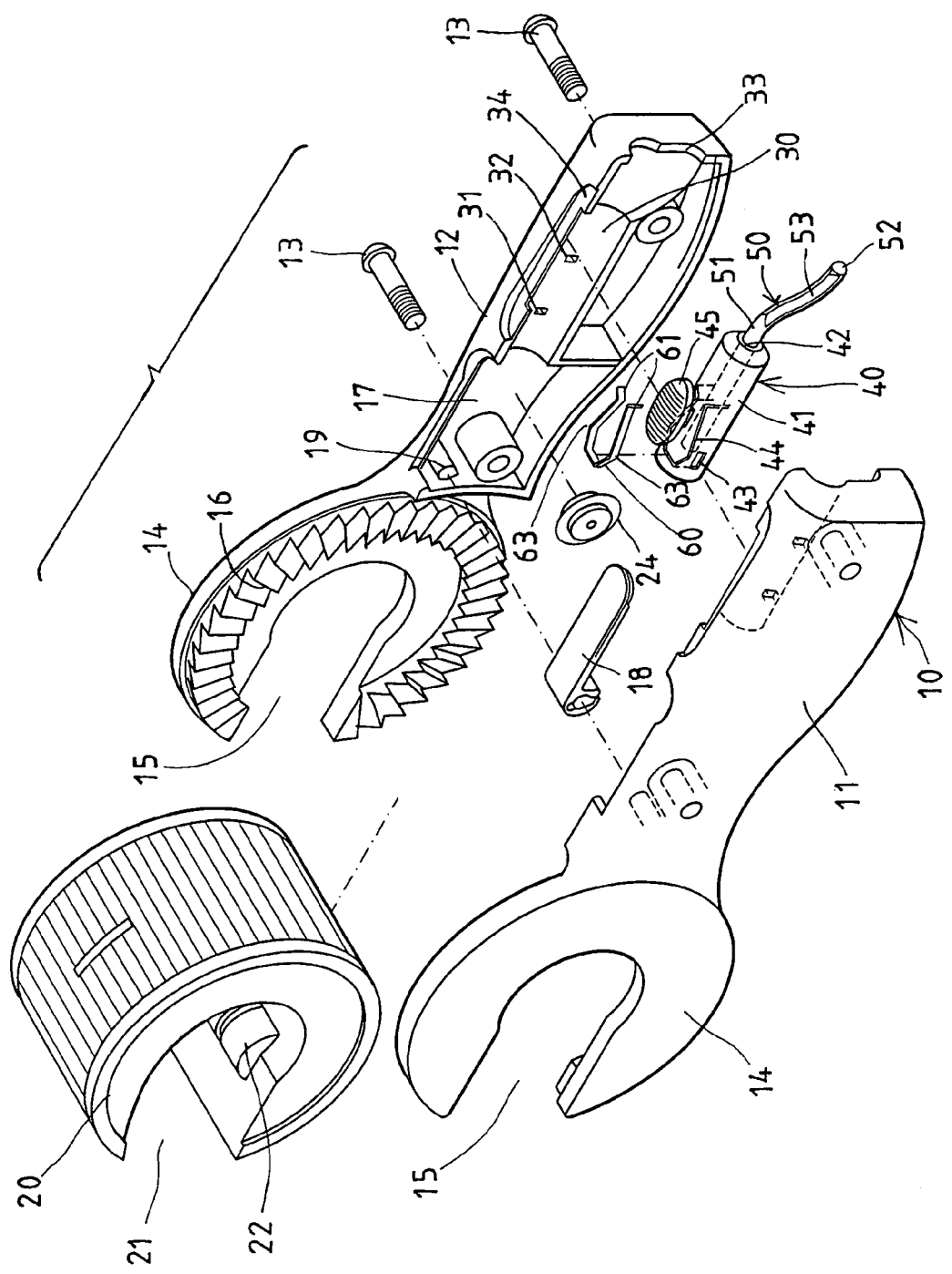
FIG. 1 is an exploded view of a tube cutter in accordance with the present invention.
Figure 2:
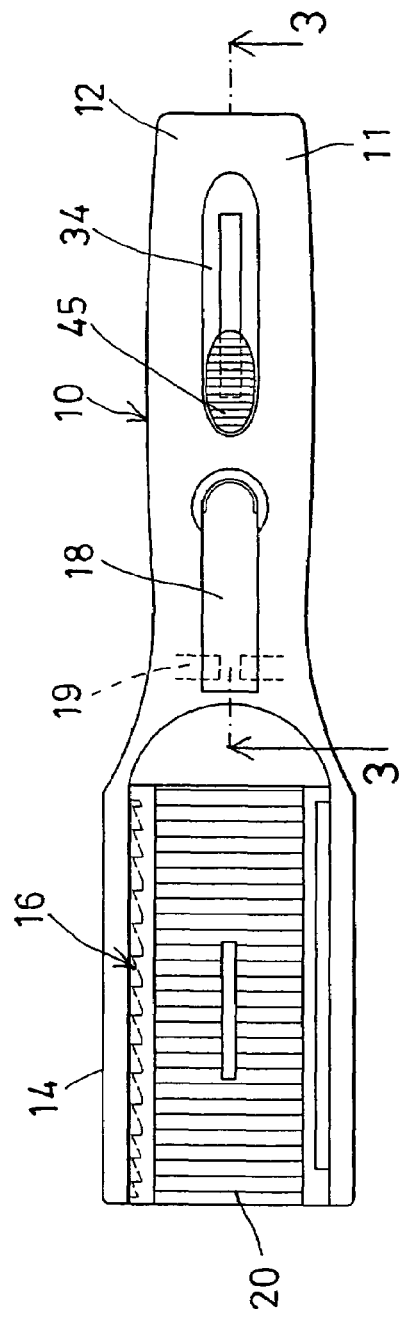
FIG. 2 is a top plan view of the tube cutter.
Figure 3:
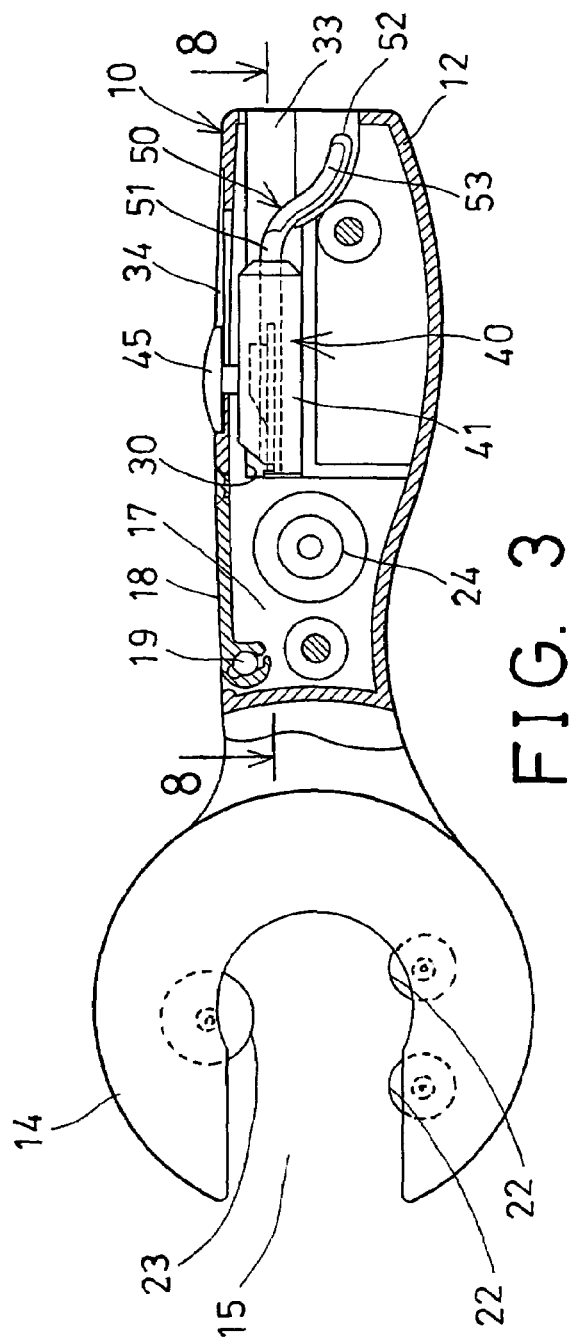
FIG. 3 is a partial cross sectional view of the tube cutter, taken along lines 3—3 of FIG. 2.
Figure 4:
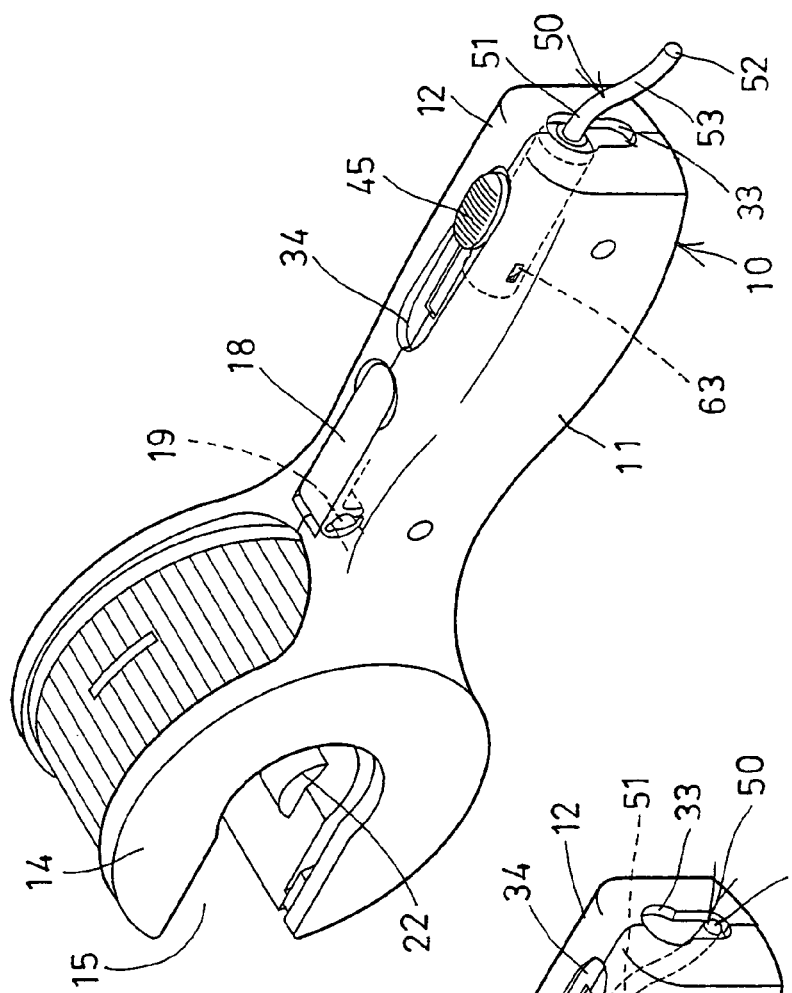
FIG. 4 is a perspective view of the tube cutter.

Referring to the drawings, and initially to FIGS. 1–4, a tube cutter in accordance with the present invention comprises a handle 10 including two handle members 11, 12 that may be secured together by such as adhesive materials, fasteners 13, or by welding processes. The handle 10 includes a housing 14 formed or provided on one end thereof and having an opening 15 formed therein, for receiving tubular members (not shown) to be cut.

A wheel 20 is rotatably received in the housing 14, and engaged with the housing 14 with a ratchet mechanism 16 (FIGS. 1, 2), to allow the wheel 20 to be rotated relative to the housing 14 in one direction only, or to allow the wheel 20 to be rotated freely relative to the housing 14 in one direction and to allow the wheel 20 to be driven in the other or opposite direction by the housing 14 and the handle 10.

The wheel 20 also includes an opening 21 formed therein, for aligning with the opening 15 of the housing 14 or of the handle 10, and for receiving the tubular members (not shown) to be cut. The tubular members may be stably retained in the opening 21 of the wheel 20 when the wheel 20 has been rotated relative to the housing 14, and when the opening 21 of the wheel 20 is offset from the opening 15 of the housing 14 or of the handle 10.

The wheel 20 includes one or more rollers 22 rotatably received therein to rotatably support the tubular members within the opening 21 of the wheel 20, and a circular cutter blade 23 rotatably attached to the wheel 20 (FIGS. 3, 6), for engaging with and for cutting the tubular members. Two examples of the tube cutters have been disclosed in U.S. Pat. No. 4,177,557 Courty, and U.S. Pat. No. 5,206,996 McDaniel, which may be taken as references for the present invention.

The handle 10 includes a space 17 formed therein, for receiving one or more spare cutter blades 24 therein (FIGS. 1, 3), and a cover 18 rotatably attached to the handle 10 with a pivot pin 19, to allow the cover 18 to enclose the space 17 of the handle 10 and thus to retain the spare cutter blades 24 within the space 17 of the handle 10 (FIG. 3), or to open the space 17 of the handle 10, and thus to allow the spare cutter blades 24 to be engaged into or removed from the space 17 of the handle 10 (FIG. 6).

As shown in FIGS. 1 and 6–7, the handle 10 includes a chamber 30 formed therein, such as formed in the rear portion thereof, for receiving a tool device 40 therein, and includes one or more, such as two or two pairs of cavities 31, 32 formed therein, and communicating with the chamber 30 thereof, and includes an orifice 33 formed in the rear portion thereof, and communicating with the chamber 30 thereof, and includes a recessed channel 34 provided or formed in the upper portion therein.

Figure 5:
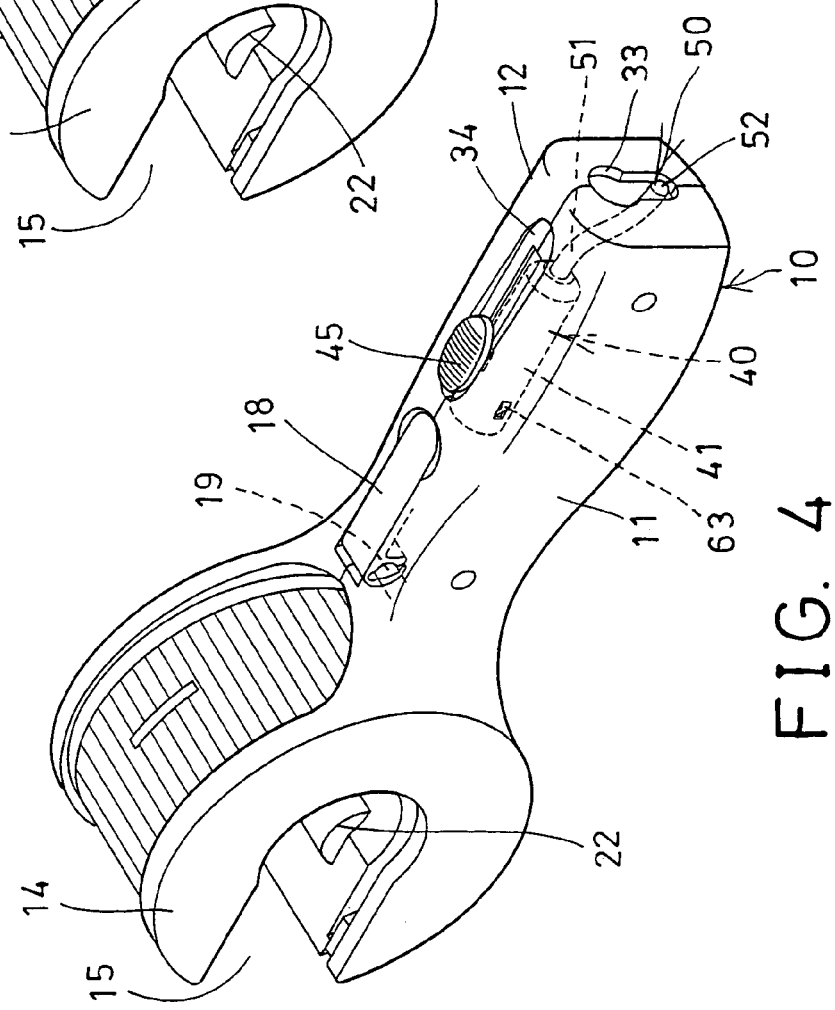
FIG. 5 is a perspective view similar to FIG. 4, illustrating the operation of the tube cutter.

The tool device 40 includes a casing 41 slideably received in the chamber 30 of the handle 10 and extendible out of the handle 10 (FIGS. 5, 6, 10), and having an aperture 42 formed therein for rotatably receiving a tool member 50 therein. The tool member 50 includes a shank 51 rotatably received in the aperture 42 of the casing 41, and includes a bent stem 52 extended from the shank 51 and having a knurled or file surface or one or more cutting or trimming edges 53 provided thereon.

The casing 41 further includes two side openings 43 formed therein, and includes a substantially U-shaped groove 44 formed therein, and communicating with the aperture 42 and the side openings 43 thereof, for receiving a corresponding U-shaped spring member 60 therein (FIG. 1). The spring member 60 includes two inwardly bent segments 61 for engaging with the shank 51 of the tool member 50, and to rotatably retain the shank 51 of the tool member 50 within the aperture 42 of the casing 41.

Figure 8:
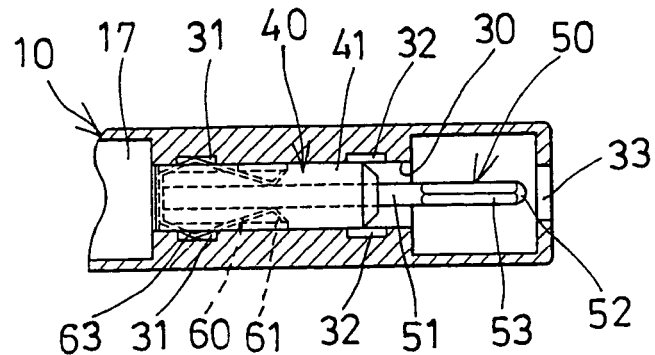
FIG. 8 is a partial cross sectional view taken along lines 8—8 of FIG. 3.
Figure 9:
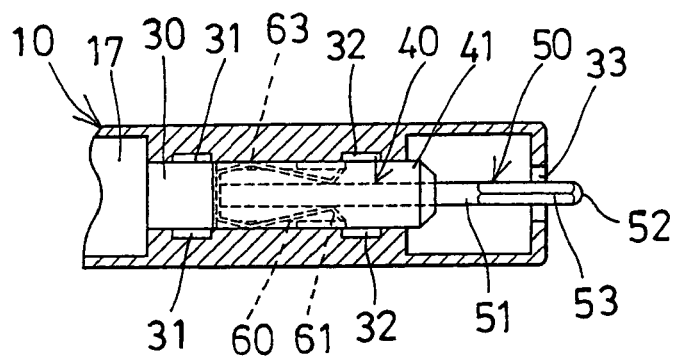
FIGS. 9 and 10 are partial cross sectional views similar to FIG. 8, illustrating the operation of the trimming tool device of the tube cutter.

The spring member 60 further includes two outwardly bent segments 63 partially extended out through the side openings 43 of the casing 41, and engageable with either of the cavities 31, 32 of the handle 10 (FIGS. 8, 10), to position the casing 41 to the handle 10. A knob 45 is attached to the casing 41, and slideably engaged in the recessed channel 34 of the handle 10, to move the casing 41 relative to the handle 10, and thus to move the tool member 50 into and out of the handle 10.

When the tool member 50 is moved into the handle 10 by moving the casing 41 inwardly relative to the handle 10, the outwardly bent segments 63 of the spring member 60 may be engaged with the inner cavities 31 of the handle 10 (FIG. 8), to position the casing 41 and thus the tool member 50 within the handle 10. On the contrary, when the tool member 50 is moved out of the handle 10 by moving the casing 41 outwardly relative to the handle 10, the outwardly bent segments 63 of the spring member 60 may be engaged with the outer cavities 32 of the handle 10 (FIG. 10), to position the casing 41 and thus the tool member 50 in an outer working position relative to the handle 10.

Figure 10:
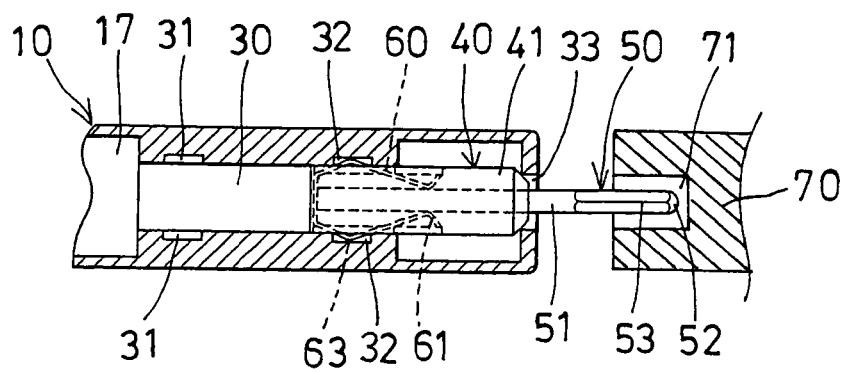

In operation, as shown in FIG. 10, the outwardly extended tool member 50 may be engaged into a drilled hole 71 of an object 70, and may be rotated relative to the object 70 by moving or rotating the handle 10 relative to the object 70, in order to trim or to scrape or to finish the opening of the drilled hole 71 of the object 70, and to smooth the bur or rough opening of the drilled hole 71 of the object 70. It is to be noted that the spring member 60 may be used to rotatably retain the shank 51 of the tool member 50 within the aperture 42 of the casing 41, and may simultaneously be used to position the casing 41 and thus the tool member 50 relative to the handle 10.

Accordingly, the tube cutter in accordance with the present invention includes a space formed or provided therein to receive or store one or more spare cutter blades therein, and for allowing the cutter blades to be changed with the other ones or the new ones when the original cutter blades have been worn out or damaged, and includes a retractable tool device received therein and extendible out for trimming or finishing holes or openings of objects.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A tube cutter comprising:
   a handle including a housing provided thereon, and including a chamber formed therein, and including a rear orifice formed therein and communicating with said chamber thereof, said handle including at least one first cavity formed therein,
   a tool device including a casing slideably received in said chamber of said housing, and having an aperture and two side openings formed therein, and having a U-shaped groove formed therein and communicating with said aperture and said side openings thereof,
   a tool member including a shank rotatably received in said aperture of said casing, and including a stem extended from said shank and having at least one trimming edge provided thereon, and
   a U-shaped spring member received in said U-shaped groove of said casing, and including two inwardly bent segments for engaging with said shank of said tool member, and to rotatably retain said shank of said tool member within said aperture of said casing, and including two outwardly bent segments extended out through said side openings of said casing, and engageable with said at least one first cavity of said handle, to position said casing to said handle when said tool member is moved out of said handle.

2. The tube cutter as claimed in claim 1, wherein said tool device includes a knob attached to said casing, to move said casing relative to said handle, and to move said tool member into and out of said handle.

3. The tube cutter as claimed in claim 2, wherein said handle includes a recessed channel formed therein to slideably receive said knob.

4. The tube cutter as claimed in claim 1, wherein said housing includes an opening formed therein, and a wheel rotatably attached to said housing and having an opening formed therein, for aligning with said opening of said housing, and for receiving tubular members to be cut.

5. The tube cutter as claimed in claim 4, wherein said wheel includes a cutter blade rotatably attached thereto for cutting tubular members.

6. The tube cutter as claimed in claim 5, wherein said wheel includes two rollers rotatably attached thereto for retaining tubular members between said rollers and said cutter blade.

7. The tube cutter as claimed in claim 1, wherein said handle includes at least one second cavity formed therein, and said outwardly bent segments of said spring member are engageable with said at least one second cavity of said handle, to position said casing to said handle when said tool member is moved into said handle.

8. The tube cutter as claimed in claim 1, wherein said handle includes a space formed therein, and at least one spare cutter blade received in said space of said handle.

9. The tube cutter as claimed in claim 8, wherein said handle includes a cover rotatably attached thereto, to open or to enclose said space of said handle, and to retain said at least one spare cutter blade in said space of said handle.

10. The tube cutter as claimed in claim 1, wherein said stem of said tool member is a bent stem.

* * * * *